United States Patent
Yu et al.

(10) Patent No.: US 10,732,650 B1
(45) Date of Patent: Aug. 4, 2020

(54) VACUUM LARGE-CAPACITY ELECTRICALLY CONTROLLED PROPORTIONAL VALVE

(71) Applicant: TAIWAN CHELIC Co., Ltd., New Taipei (TW)

(72) Inventors: Ping-Cheng Yu, New Taipei (TW); Chih-Sheng Cheng, New Taipei (TW); Yu-Li Chen, New Taipei (TW)

(73) Assignee: TAIWAN CHELIC CO., LTD., New Taipei (TW)

( * ) Notice: Subject to any disclaimer, the term of this patent is extended or adjusted under 35 U.S.C. 154(b) by 0 days.

(21) Appl. No.: 16/387,554

(22) Filed: Apr. 18, 2019

(30) Foreign Application Priority Data

Mar. 8, 2019 (TW) .............................. 108107797 A (51) Int. Cl.
| | |
|---|---|
| *F16K 31/128* | (2006.01) |
| *G05D 16/20* | (2006.01) |
| *F16K 51/02* | (2006.01) |
| *F16K 17/04* | (2006.01) |

(52) U.S. Cl.
CPC ......... *G05D 16/2013* (2013.01); *F16K 51/02* (2013.01); *F15B 2211/565* (2013.01); *F16K 17/048* (2013.01); *G05D 16/2095* (2019.01); *G05D 16/2097* (2019.01)

(58) Field of Classification Search
CPC ........... G05D 16/2013; G05D 16/2095; G05D 16/2097; F16K 51/02; F16K 17/048; F16K 15/186; F16K 27/029; F16K 31/046; F15B 2211/565; F15B 2211/50509; F15B 2211/635

USPC ...... 137/487.5, 487, 565.14, 565.16, 565.23, 137/596.16, 486, 14, 505.15, 505.36, 137/489.5, 492, 492.5, 625.64
See application file for complete search history.

(56) References Cited

U.S. PATENT DOCUMENTS

| | | | | |
|---|---|---|---|---|
| 2,637,946 | A * | 5/1953 | Parks ................... | G05D 16/163 137/489.5 |
| 4,638,837 | A * | 1/1987 | Buike ...................... | B62D 5/06 137/596.16 |
| 5,586,575 | A * | 12/1996 | Bergamini .......... | F15B 13/0438 137/488 |
| 5,887,847 | A * | 3/1999 | Holborow ............. | F16K 31/128 251/33 |

(Continued)

*Primary Examiner* — Minh Q Le
(74) *Attorney, Agent, or Firm* — Leong C. Lei (57) ABSTRACT

A vacuum large-capacity electrically controlled proportional valve includes a main body having a valve bottom seat, a middle valve seat, and a guide seat and has a vacuum pressure chamber, in which a main diaphragm is arranged with an elastic element provided thereon to connect with the guide seat. A pilot discharge straight rod is fit to a center of the main diaphragm. The main body includes a master channel connected to a guide channel and a feedback channel Provided above the guide seat are a vacuum pressure electromagnetic valve, an atmospheric pressure electromagnetic valve, and a sensor. The guide seat includes a regulation channel connected to the vacuum pressure chamber. A pilot atmosphere channel is connected to a space under the main diaphragm. A first and a second vacuum destruction valve gates are provided and driven by an external atmospheric pressure for speeding up decrease of interior vacuum level.

3 Claims, 14 Drawing Sheets

(56) References Cited

U.S. PATENT DOCUMENTS

| | | | | |
|---|---|---|---|---|
| 6,305,401 B1* | 10/2001 | Uehara | ............... | G05D 16/2095 |
| | | | | 137/102 |
| 6,338,358 B1* | 1/2002 | Watanabe | ........... | G05D 16/2093 |
| | | | | 137/102 |
| 6,779,541 B2* | 8/2004 | Inayama | ............ | G05D 16/2095 |
| | | | | 137/102 |
| 8,409,214 B2* | 4/2013 | Lonky | ..................... | A61M 1/08 |
| | | | | 606/123 |
| 8,847,103 B2* | 9/2014 | Retnaswamy | ......... | B23K 10/00 |
| | | | | 219/121.54 |
| 9,062,798 B2* | 6/2015 | Neef | ....................... | F16K 47/04 |
| 2002/0036013 A1* | 3/2002 | Inayama | ............ | G05D 16/2024 |
| | | | | 137/487.5 |
| 2006/0097644 A1* | 5/2006 | Kono | ................... | G05D 16/206 |
| | | | | 315/111.21 |
| 2012/0204974 A1* | 8/2012 | Sakasegawa | .......... | G05D 7/005 |
| | | | | 137/486 |
| 2014/0358303 A1* | 12/2014 | Leonard | ............ | G05D 16/2053 |
| | | | | 700/283 |
| 2014/0358304 A1* | 12/2014 | Muir | .................. | G05D 16/2053 |
| | | | | 700/283 |
| 2015/0224620 A1* | 8/2015 | Takahashi | ............... | B24B 37/30 |
| | | | | 451/442 |
| 2017/0351275 A1* | 12/2017 | Ito | ..................... | G05D 16/2053 |

\* cited by examiner

RRIOR ART
FIG. 14

VACUUM LARGE-CAPACITY ELECTRICALLY CONTROLLED PROPORTIONAL VALVE

(a) TECHNICAL FIELD OF THE INVENTION

The present invention relates to a vacuum large-capacity electrically controlled proportional valve, which uses a pilot discharge straight rod and a vacuum valve gate assembly arranged in an interior thereof, together with a pilot atmosphere channel that conducts in an atmospheric pressure, and a master channel and a secondary channel connected to and in communication with a primary side pressure and a secondary side pressure to have the pilot discharge straight rod to carry out, through upward and downward movement, adjustment of a vacuum level so as to achieve the purposes of energy saving and accurate regulation.

(b) DESCRIPTION OF THE PRIOR ART

Figure 14:
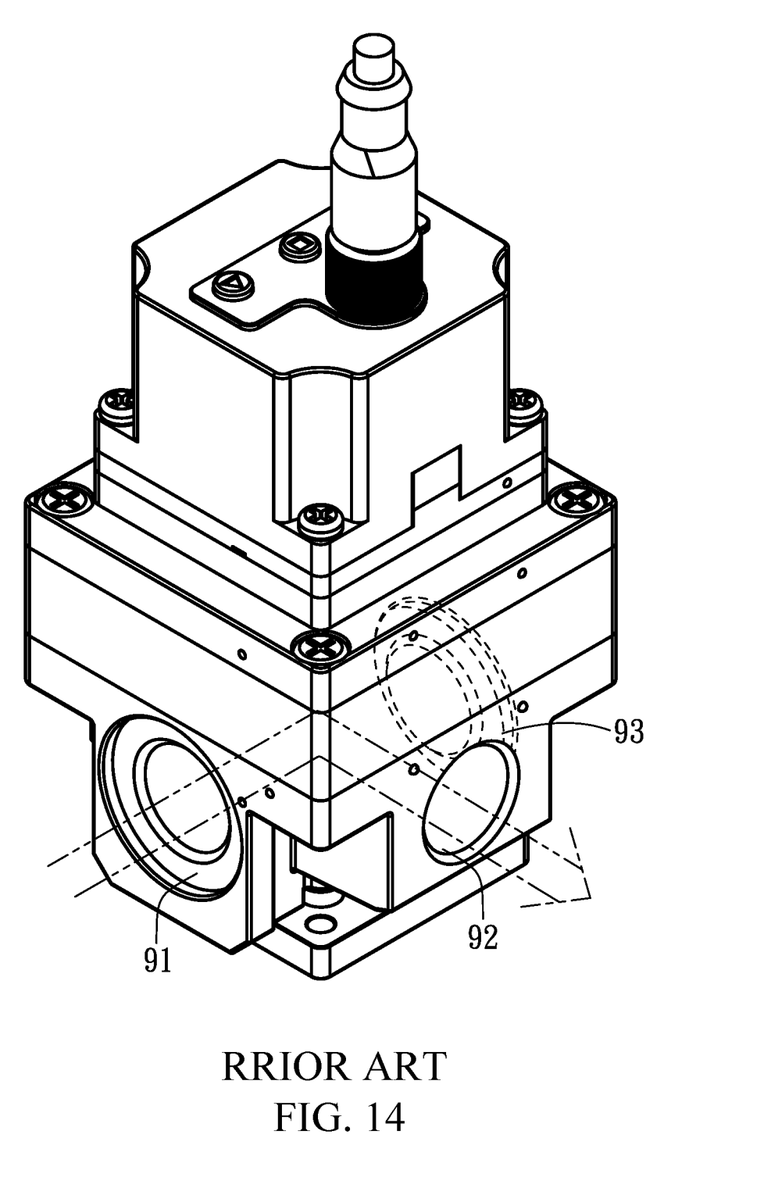
FIG. 14 is a schematic view showing prior art.

Heretofore, a vacuum electrically controlled proportional valve that is widely used in the field of automatized facility, as shown in FIG. 14, generally comprises a prior art setting hole (91) for sucking an object, a prior art vacuum hole (92) for connection with a vacuum pump, and a prior art atmosphere hole (93) for adjusting a vacuum pressure, wherein, generally, with an operation of the vacuum pump, an internal channel of the vacuum electrically controlled proportional valve draws in the pressure and flow of the prior art setting hole (91) to flow toward the prior art vacuum hole (92) to form vacuum, as indicated by arrows provided in the drawing.

To carry out a test operation of a vacuum electrically controlled proportional valve, an operator must rely on long-term experience and repeated testing to make a perfect vacuum electrically controlled proportional valve. However, a circuit formed in the structure of the vacuum electrically controlled proportional valve is relatively complicated, making it necessary to connect vacuum pressure pipes and facility that is provided for testing operations in a manner of 90 degree bending. For a test operator, additional time and effort must be spent because connecting the vacuum pressure pipes and the test facility to carry out test cannot be accompanied through a straightforward-entry and straightforward-exit manner of assembling.

In view of the internal circuit of the prior art vacuum electrically controlled proportional valve, modification of the interior pneumatic circuit requires expenses of time and money for making improvement. Although the connection with an external test vacuum pressure pipeline can be modified and changed, there are still tests that must be carried out for various parts and components. Parts for regulation and control of vacuum must be re-designed in order to preserve the accuracy of vacuum control that was originally possessed. For applications to vacuum electrically controlled proportional valves having even large capacities, the pipe connection and parts issues discussed above would become even more complicated. Thus, various improvements are further desired.

SUMMARY OF THE INVENTION

The present invention provides a vacuum large-capacity electrically controlled proportional valve, of which a technical purpose is to use a pilot discharge straight rod in combination with a first vacuum destruction valve gate and second vacuum destruction valve gate arranged in an interior of a main body to carry out decrease of a vacuum level and to use a first valve gate and a second valve gate that are also arranged in the interior of the main body to carry out increase of the vacuum level, so that a complicated circuit that is adopted in the structure of a prior art can be reduced and opening and closure of the previous valve gates, in combination with a pilot discharge straight rod, allows for accurately adjusting level of vacuum pressure and shortening of response time when applied to an operation of vacuum adjustment of a large-capacity electrically controlled proportional valve.

The present invention provides a vacuum large-capacity electrically controlled proportional valve, which comprises: a valve bottom seat that is connected, in sequence from bottom to top, to a middle valve seat and a guide seat to form a main body. A main diaphragm is interposed between the guide seat and the middle valve seat to form a vacuum pressure chamber. An elastic element is provided above the main diaphragm to connect with the guide seat. The main diaphragm is fit, at a center thereof, to a pilot discharge straight rod of a vacuum valve gate assembly. The main body is also provided, in an interior thereof, with a master channel that allows a primary side pressure and a secondary side pressure to flow therein. The master channel is also connected to and in communication with a guide channel and a feedback channel. The guide seat is further provided, on a top side thereof, with a vacuum pressure electromagnetic valve and an atmospheric pressure electromagnetic valve that control closure and opening of the guide channel and a sensor that carries out a detection operation on the feedback channel. The guide seat is also provided, in an interior thereof, with a regulation channel that is connected to and in communication with a top of the vacuum pressure chamber. Two ends of the regulation channel are respectively connected to the vacuum pressure electromagnetic valve and the atmospheric pressure electromagnetic valve. A pilot atmosphere channel is formed in the middle valve seat and connected to and in communication with a space below the main diaphragm for an atmospheric pressure to flow.

When the primary side pressure passes through the guide channel, in collaboration with an operation of the vacuum pressure electromagnetic valve to generate a vacuum pressure to flow to the vacuum pressure chamber, through the regulation channel being closed, the main diaphragm of the vacuum pressure chamber returns to a horizontal position to form a steady pressure state. The pilot discharge straight rod is formed with a first vacuum destruction valve gate above the middle valve seat and the vacuum valve gate assembly is formed with a second vacuum destruction valve gate that is arranged in combination with an upper valve internal wall in an interior of the valve bottom seat so that an external atmospheric pressure conducted in through an atmosphere opening of the atmospheric pressure electromagnetic valve drives the first vacuum destruction valve gate and the second vacuum destruction valve gate for making decrease of vacuum of the interior of the main body more quickly and thus shortening a response time of vacuum suction.

The valve bottom seat is further provided, in the interior thereof, with a straight rod fitting seat. The straight rod fitting seat forms, in combination with a lower part of the pilot discharge straight rod, a first valve gate, such that when the vacuum pressure electromagnetic valve is put in continuous operation to generate a vacuum pressure, the first valve gate is caused to open and the primary side pressure passes through a secondary channel to form the secondary side pressure. A lower part of the vacuum valve gate assembly forms, in combination with a lower valve internal wall in the interior of the valve bottom seat, a second valve gate. The second valve gate helps accelerate conduction of the primary side pressure into the secondary side pressure. The second valve gate also drives a third valve gate to close and open, making a speed of increase of vacuum in the interior of the main body faster.

As such, the vacuum large-capacity electrically controlled proportional valve according to the present invention could effectively shorten a response time of vacuum suction, making it achieve the purposes of energy saving and accurate regulation of a vacuum level.

DETAILED DESCRIPTION OF THE PREFERRED EMBODIMENTS

A preferred feasible embodiment according to the present invention will be described in detail in the following, with reference being had to FIG. 1-4, to provide a better understanding of the present invention.

The present invention is a vacuum large-capacity electrically controlled proportional valve, which has a structure comprising: a main body (10), which is formed by connecting, in sequence from bottom to top, a middle valve seat (12) and a guide seat (13) to a valve bottom seat (11), with a main diaphragm (20) interposed between the guide seat (13) and the middle valve seat (12) to form a vacuum pressure chamber (23) and an elastic element (201) being provided above the main diaphragm (20) to connect with the guide seat (13), the main diaphragm (20) being fit, at a center thereof, to a pilot discharge straight rod (21) of a vacuum valve gate assembly (22). The vacuum valve gate assembly (22) is generally formed of two convex members (222) that are arranged with convex surfaces thereof facing each other and in combination with a spring (223). The convex members (222) each have an interior made in a penetrating configuration to receive the pilot discharge straight rod (21) to be fit therein. The pilot discharge straight rod (21) is provided with a position-constraining projecting pawl (224) at each of two portions, an upper one and a lower one, of a circumference thereof in order to provide constraints to strokes of upward and downward movements of the pilot discharge straight rod (21).

The previously mentioned main body (10) is also provided, in an interior thereof, with a master channel (30) that allows a primary side pressure (P1) and a secondary side pressure (P2) to flow therein. This master channel (30) is also connected to and in communication with a guide channel (31) and a feedback channel (32). The guide seat (13) is further provided, on a top side thereof, with a vacuum pressure electromagnetic valve (131) and an atmospheric pressure electromagnetic valve (132) that control closure and opening of the guide channel (31) and a sensor (133) that carries out a detection operation on the feedback channel (32). The guide seat (13) is also provided, in an interior thereof, with a regulation channel (134) that is connected to and in communication with a top of the vacuum pressure chamber (23). Two ends of the regulation channel (134) are respectively connected to the vacuum pressure electromagnetic valve (131) and the atmospheric pressure electromagnetic valve (132).

A pilot atmosphere channel (121) is formed in the middle valve seat (12) and connected to and in communication with a space below the main diaphragm (20) to receive an atmospheric pressure (PP) to flow therein. When the primary side pressure (P1) passes through the guide channel (31), in collaboration with an operation of the vacuum pressure electromagnetic valve (131) to generate a vacuum pressure (PT) to flow to the vacuum pressure chamber (23), the regulation channel (134) is caused to close and the main diaphragm (20) of the vacuum pressure chamber (23) returns to a horizontal position to form a steady pressure state.

The pilot discharge straight rod (21) is provided with a first vacuum destruction valve gate (211) above the middle valve seat (12) and the vacuum valve gate assembly (22) is provided thereon with a second vacuum destruction valve gate (221) that is arranged in combination with an upper valve internal wall (111) in an interior of the valve bottom seat (11) so that an external atmospheric pressure (PP) conducted in through an atmosphere opening (1321) of the atmospheric pressure electromagnetic valve (132) drives the first vacuum destruction valve gate (211) and the second vacuum destruction valve gate (221) for making decrease of vacuum of the interior of the main body (10) more quickly and thus shortening a response time of vacuum suction.

The valve bottom seat (11) is further provided, in the interior thereof, with a straight rod fitting seat (40). The straight rod fitting seat (40) forms, in combination with a lower part of the pilot discharge straight rod (21), a first valve gate (41). When the vacuum pressure electromagnetic valve (131) is put in continuous operation to generate a vacuum pressure (PT), the first valve gate (41) is caused to open and the primary side pressure (P1) passes through a secondary channel (33) to form the secondary side pressure (P2), this being a first stage of increase of vacuum level; and a lower part of the vacuum valve gate assembly (22) forms, in combination with a lower valve internal wall (112) in the interior of the valve bottom seat (11), a second valve gate (42), and the second valve gate (42) functions to accelerate conduction of the primary side pressure (P1) into the secondary side pressure (P2) so as to achieve accelerated increase of vacuum level magnitude as a second stage of increase, whereby the speed of increase of vacuum in the interior of the main body (10) is made faster.

Figure 1:
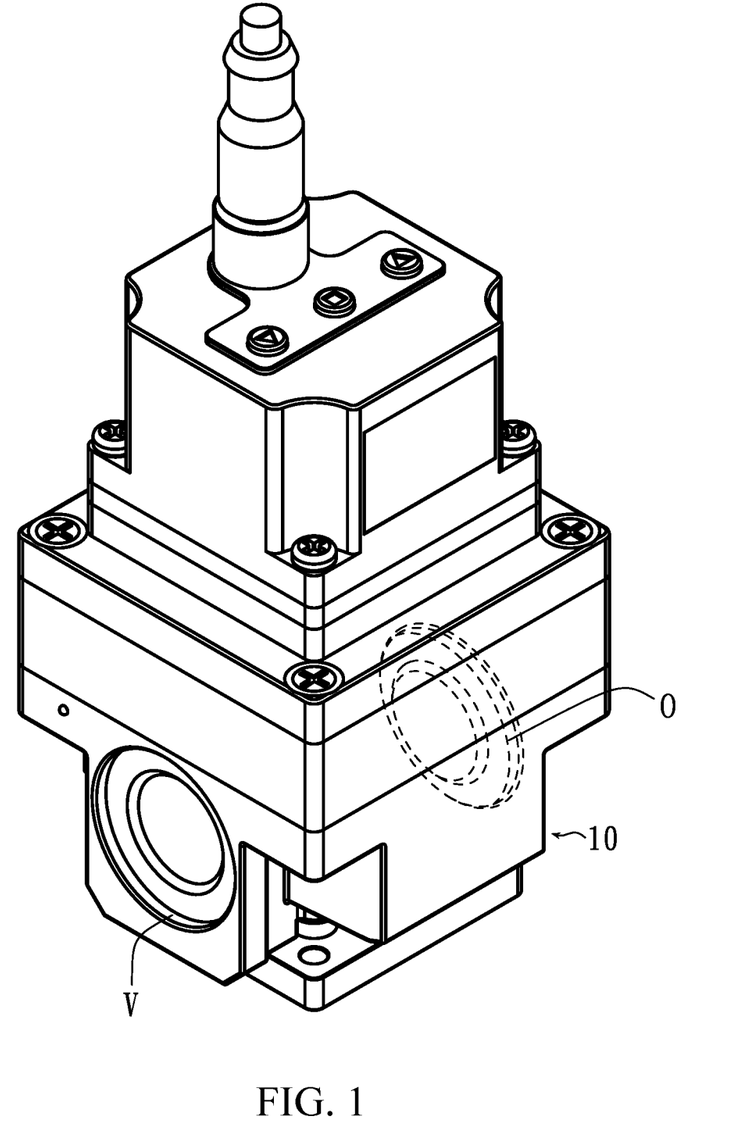
FIG. 1 is a perspective view of the present invention.
Figure 2:
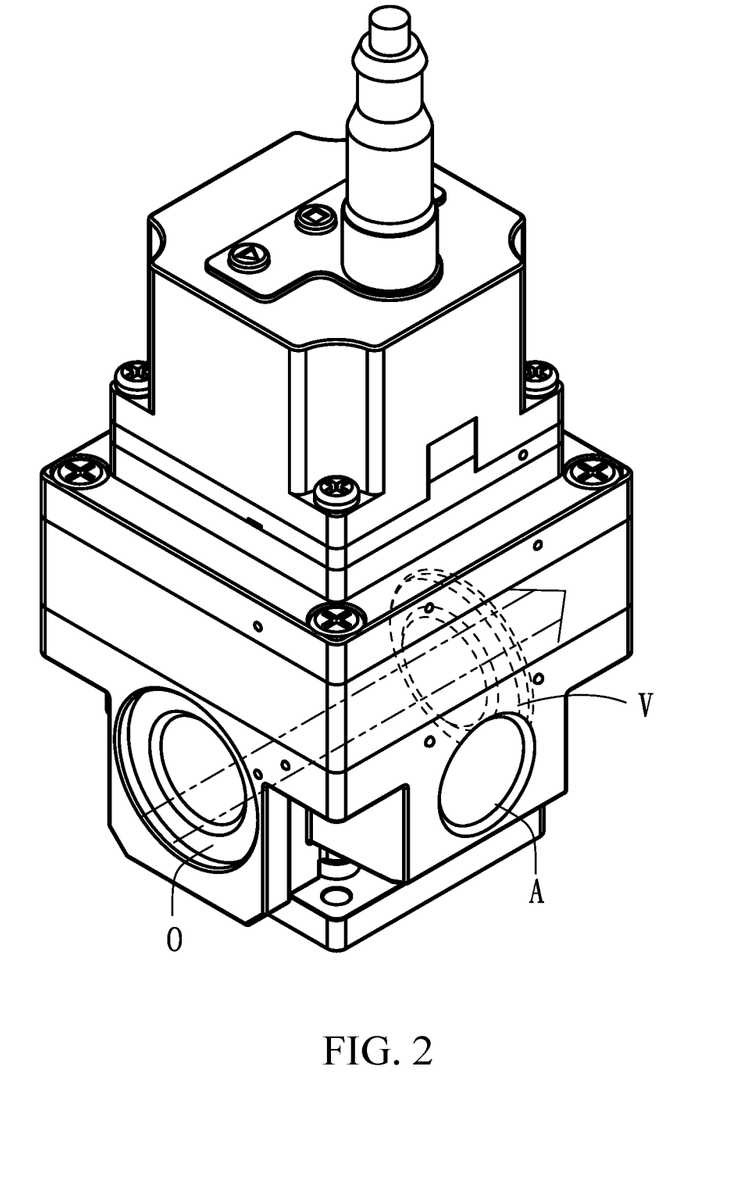
FIG. 2 is another perspective view of the present invention taken from a different direction.

Referring to FIGS. 1-2 of the drawings, the main body (10) is provided with connection terminals, which are respectively a setting hole (O) for sucking an object, a vacuum hole (V) for connecting a vacuum pump, and an atmosphere hole (A) for regulation for atmospheric pressure, wherein by means of the arrangement of the internal structure, a test pipeline can be connected such that entry through the setting hole (O) and exit through the vacuum hole (V) are made in a straightforward manner without any need of using a 90-degree bending that is found in an existing structure to carry out a test in an extraordinary manner, whereby inconvenience of carrying out a complicated operation of test can be improved.

Figure 3:
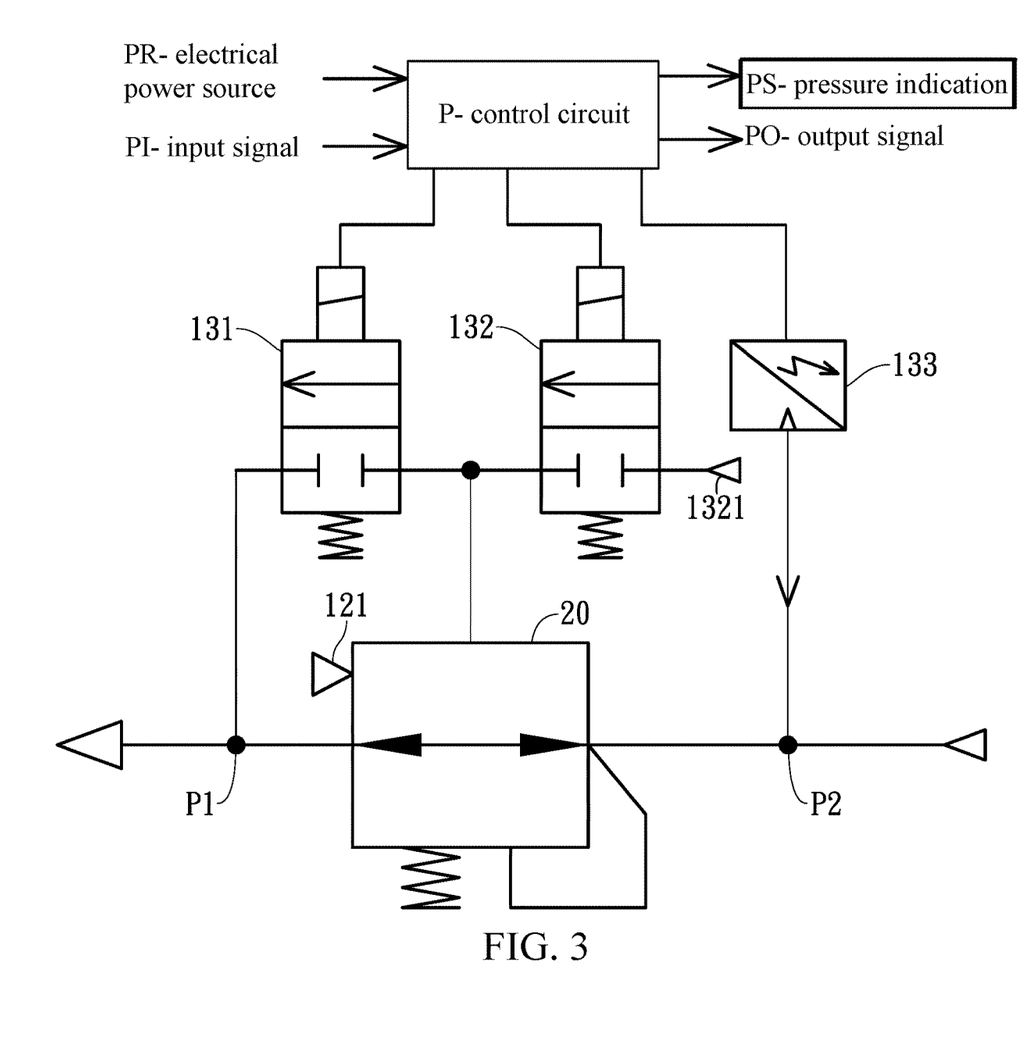
FIG. 3 is a schematic view of a circuit of the present invention.

Referring to FIG. 3 of the drawings, the vacuum pressure electromagnetic valve (131), the atmospheric pressure electromagnetic valve (132), and the sensor (133) are driven by an electrical power source (PR) by way of a control circuit (P). Once an input signal (PI) and an output signal (PO) are set up and the control circuit (P) displays pressure indication (PS), with which the vacuum pressure electromagnetic valve (131) and the atmospheric pressure electromagnetic valve (132) are put into operation. The sensor (133) is operable to detect the vacuum pressure of the secondary side pressure (P2), and in case of exceeding or being lower than a setting value of the secondary side pressure (P2), information is fed back to the control circuit (P) to carry out determination between the vacuum pressure electromagnetic valve (131) and the atmospheric pressure electromagnetic valve (132) and to drive subsequent control operations by means of the control circuit (P), this being a well-known operation of control, so that no detail is provided.

Figure 4:
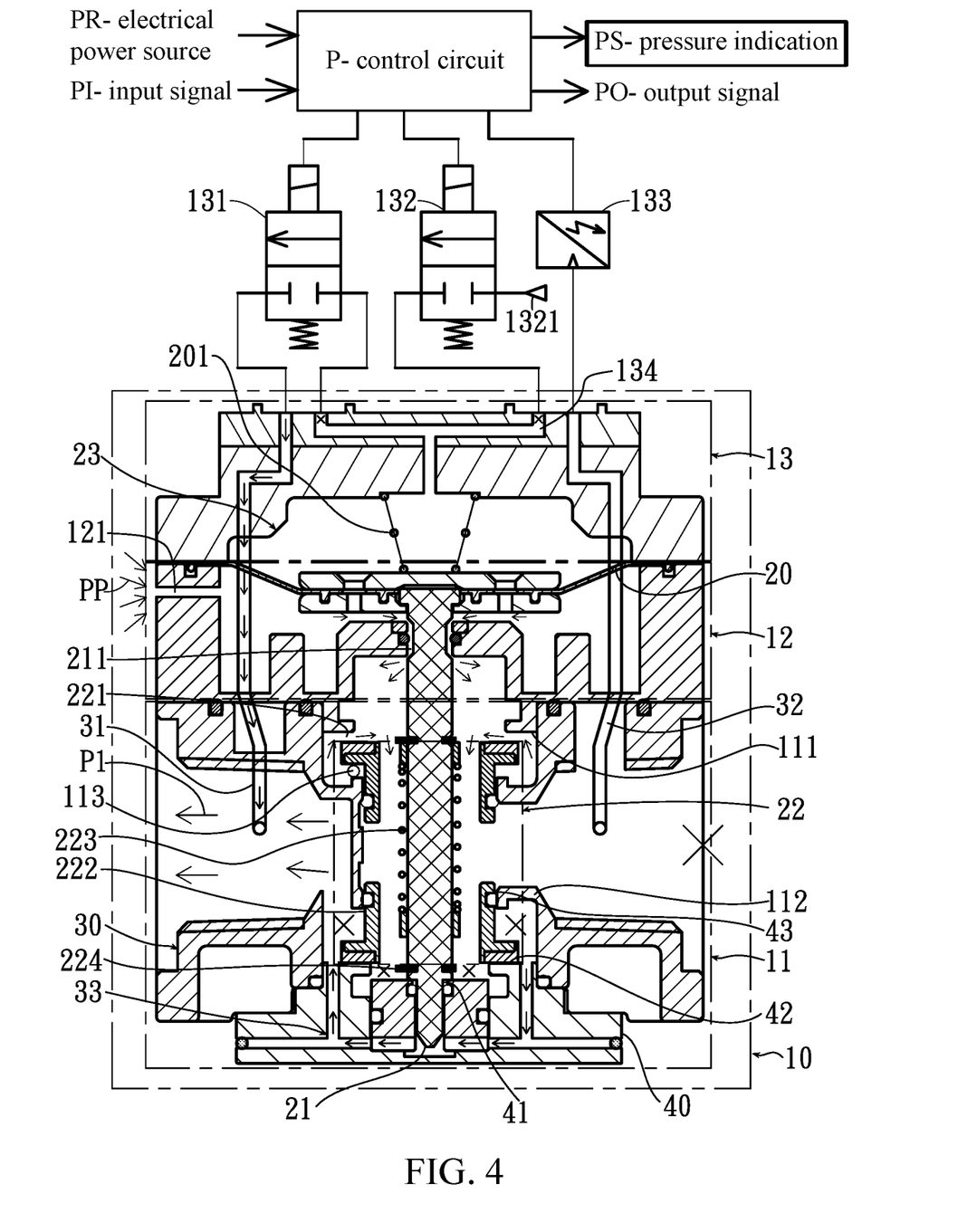
FIG. 4 is a schematic view illustrating a standby state of the present invention.

Referring to FIG. 4 of the drawings, when the present invention is in a standby state, the vacuum pressure electromagnetic valve (131) and the atmospheric pressure electromagnetic valve (132) are both in a non-activated condition and the first valve gate (41) and the second valve gate (42) in the interior of the master channel (30) are both closed. A part of the atmospheric pressure (PP) of the pilot atmosphere channel (121) flows to the underside of the main diaphragm (20), but the main diaphragm (20) is acted upon by elastic preloading of the elastic element (201) arranged at the top side so that the main diaphragm (20) maintains below the horizontal and the atmospheric pressure (PP) flows through the first vacuum destruction valve gate (211) to the secondary side pressure (P2), and under this condition, the secondary side pressure (P2) is equal to the atmospheric pressure (PP). The horizontal, as used herein, is defined, under the condition that two ends of the main diaphragm (20) are taken as a reference, as being comparison of a central portion of the main diaphragm (20) with the two ends.

Figure 5:
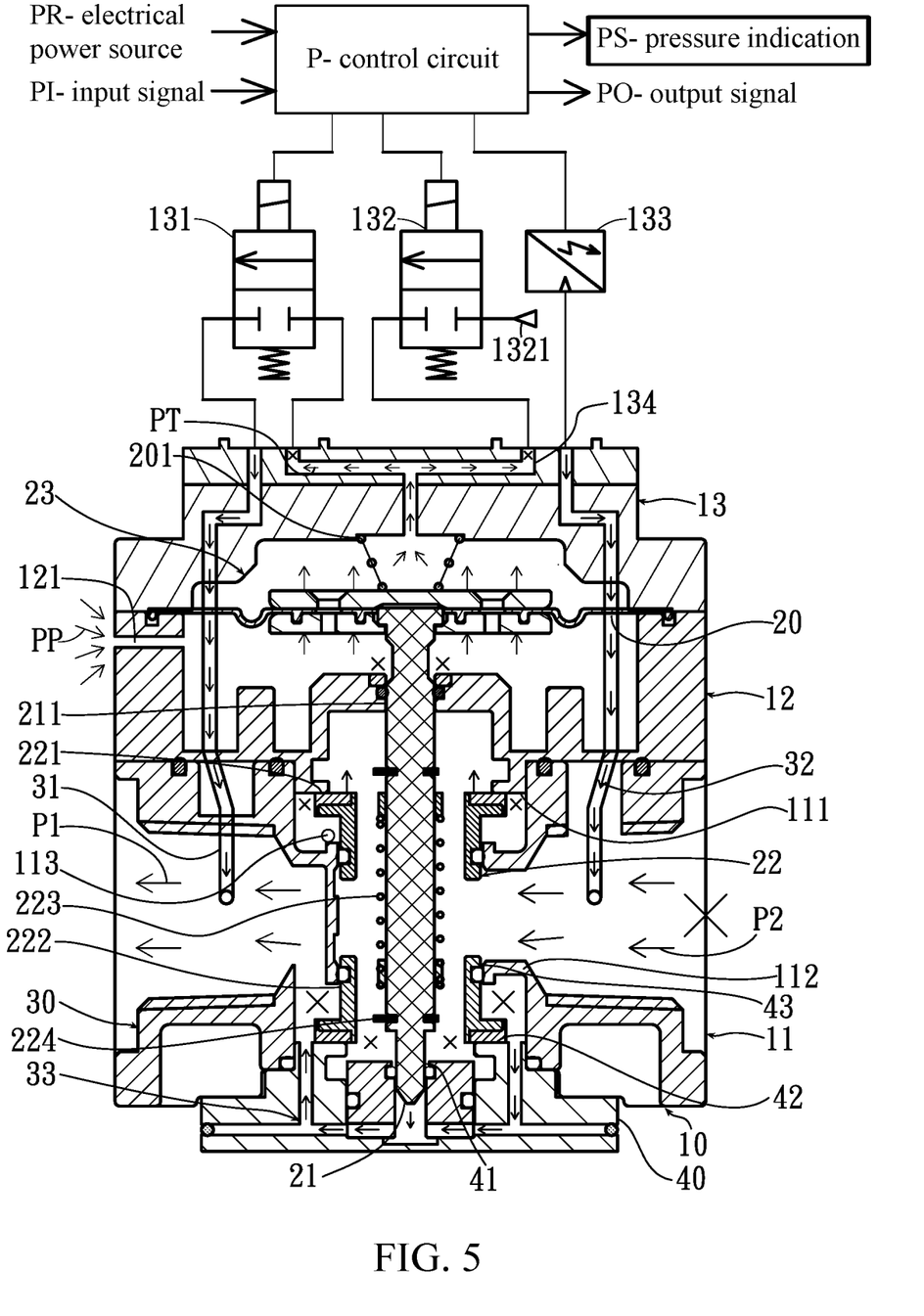
FIG. 5 is a schematic view illustrating a steady pressure state of the present invention.

Referring to FIG. 5 of the drawings, which is a steady pressure state, upon accomplishment of the purpose of sucking with vacuum, the sensor (133) transmits related information to the control circuit (P), so that the vacuum pressure electromagnetic valve (131) is closed and the vacuum pressure (PT) inside the vacuum pressure chamber (23) and the regulation channel (134) is kept steady, and under such a condition, the elastic element (201) and the atmospheric pressure (PP) entering through the pilot atmosphere channel (121) apply forces against each other to the main diaphragm (20), making the main diaphragm (20) resume to the horizontal and keeping vacuum in the entire interior of the main body (10).

Figure 6:
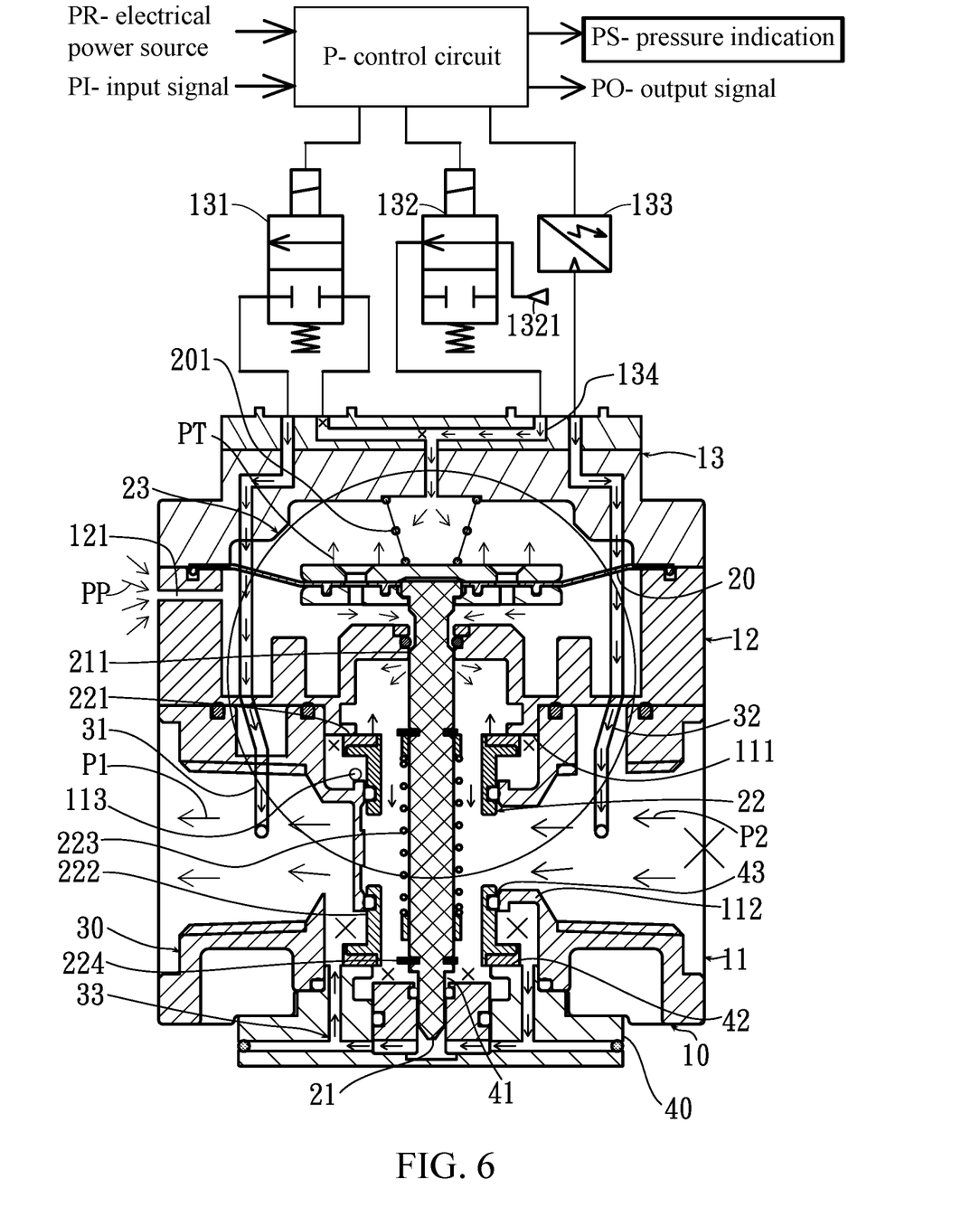
FIG. 6 is a schematic view illustrating a first stage of vacuum decrease of the present invention.
Figure 7:
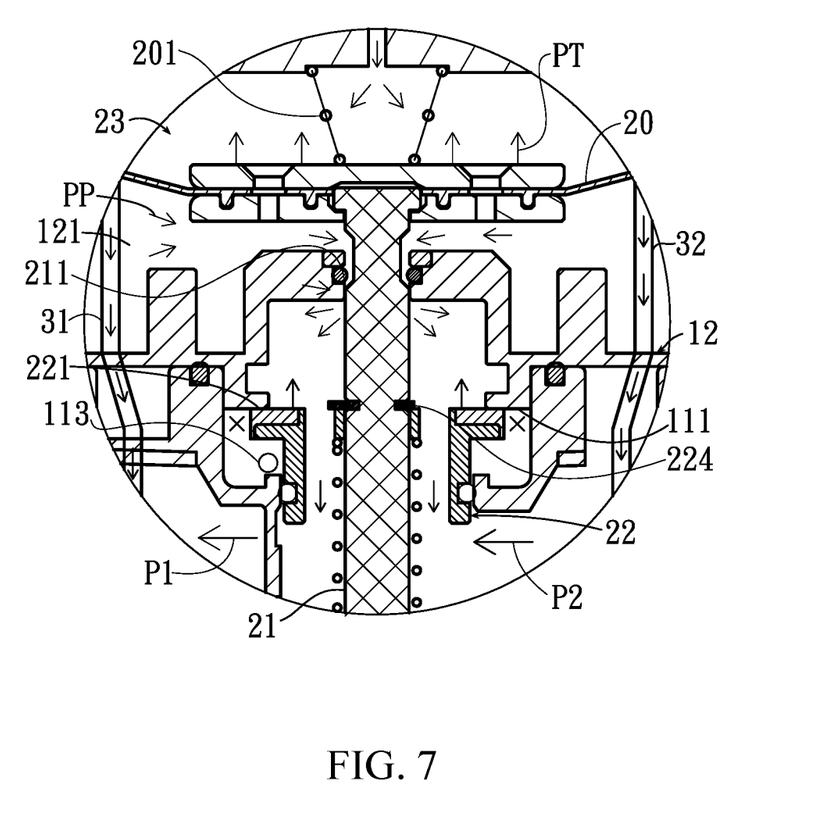
FIG. 7 is an enlarged view of a portion of FIG. 6 of the present invention.

Referring to FIGS. 6 and 7 of the drawings, which is the first stage of vacuum decreasing, the atmospheric pressure electromagnetic valve (132) is activated first and the external atmospheric pressure (PP) is conducted in through the atmosphere opening (1321), passing through the regulation channel (134) to enter the interior of the vacuum pressure chamber (23), making the main diaphragm (20) that was originally kept at the horizontal moving downward to gradually open the first vacuum destruction valve gate (211), allowing the atmospheric pressure (PP) inside the pilot atmosphere channel (121) to move down along the pilot discharge straight rod (21) to pass through the first vacuum destruction valve gate (211), so as to proceed with an regulation operation of the first stage decrease of the interior vacuum level.

Figure 8:
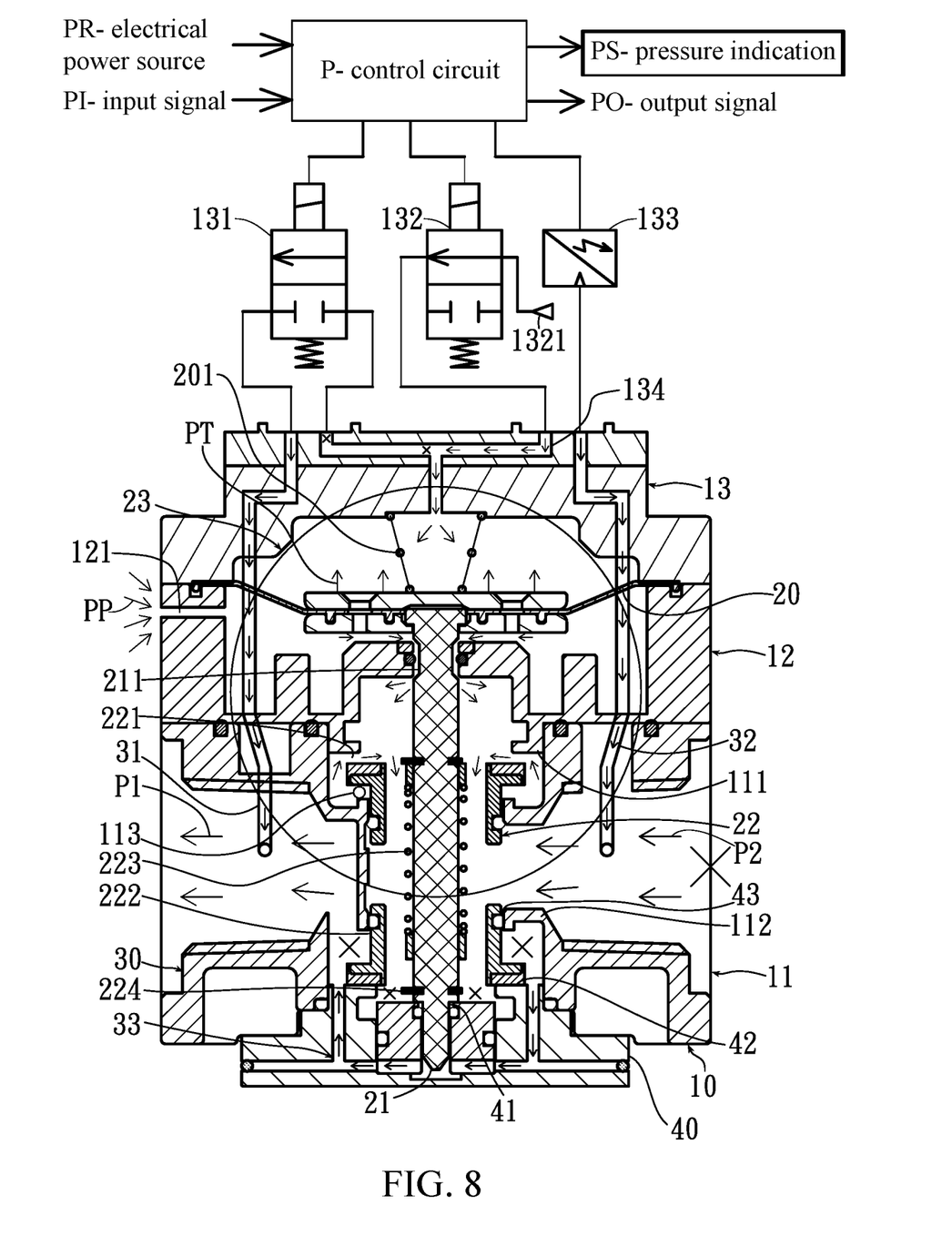
FIG. 8 is a schematic view illustrating a second stage of vacuum decrease of the present invention.
Figure 9:
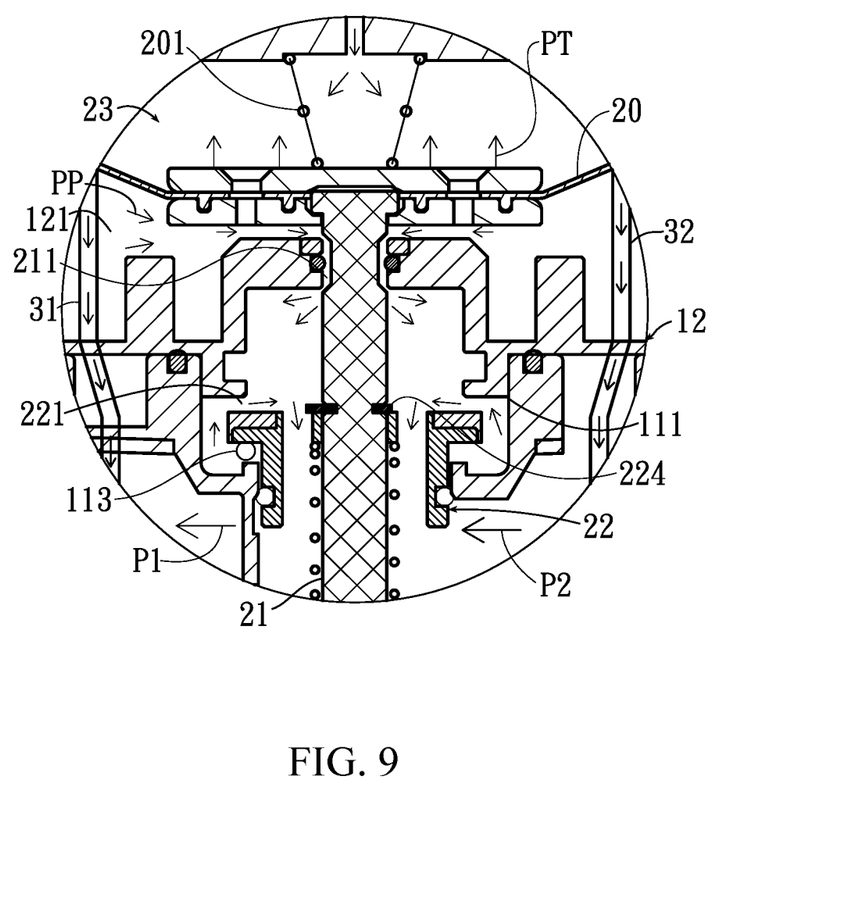
FIG. 9 is an enlarged view of a portion of FIG. 8 of the present invention.

Referring to FIGS. 8 and 9 of the drawings, which is the second stage of vacuum decreasing, with the atmospheric pressure electromagnetic valve (132) being persistently kept activated, the atmosphere opening (1321) leads in more atmospheric pressure (PP), causing the main diaphragm (20) to continue to move downward, and the position-constraining projecting pawl (224) of the pilot discharge straight rod (21) then pushes the second vacuum destruction valve gate (221) to open, and under such a condition, the atmosphere channel (113) under the second vacuum destruction valve gate (221) provides more the atmospheric pressure (PP) to enter, making the rate of decreasing the interior vacuum faster. When the main diaphragm (20) moves downward to reach a bottom of the vacuum pressure chamber (23), the flow of the atmospheric pressure (PP) entering through the pilot atmosphere channel (121) is reduced to a minimum and the flow of the atmospheric pressure (PP) entering through the atmosphere channel (121) is increased to reach a maximum.

Figure 10:
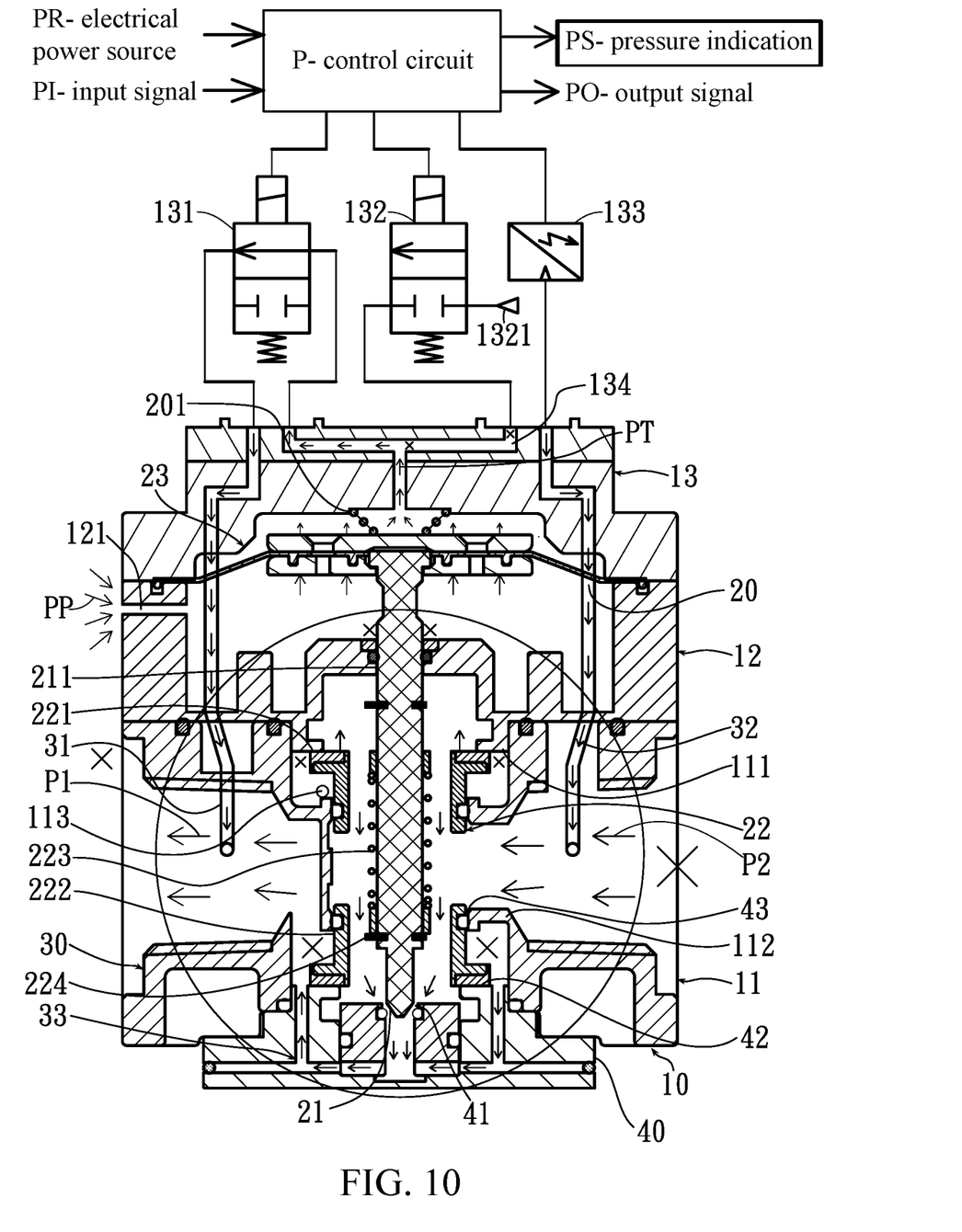
FIG. 10 is a schematic view illustrating a first stage of vacuum increase of the present invention.
Figure 11:
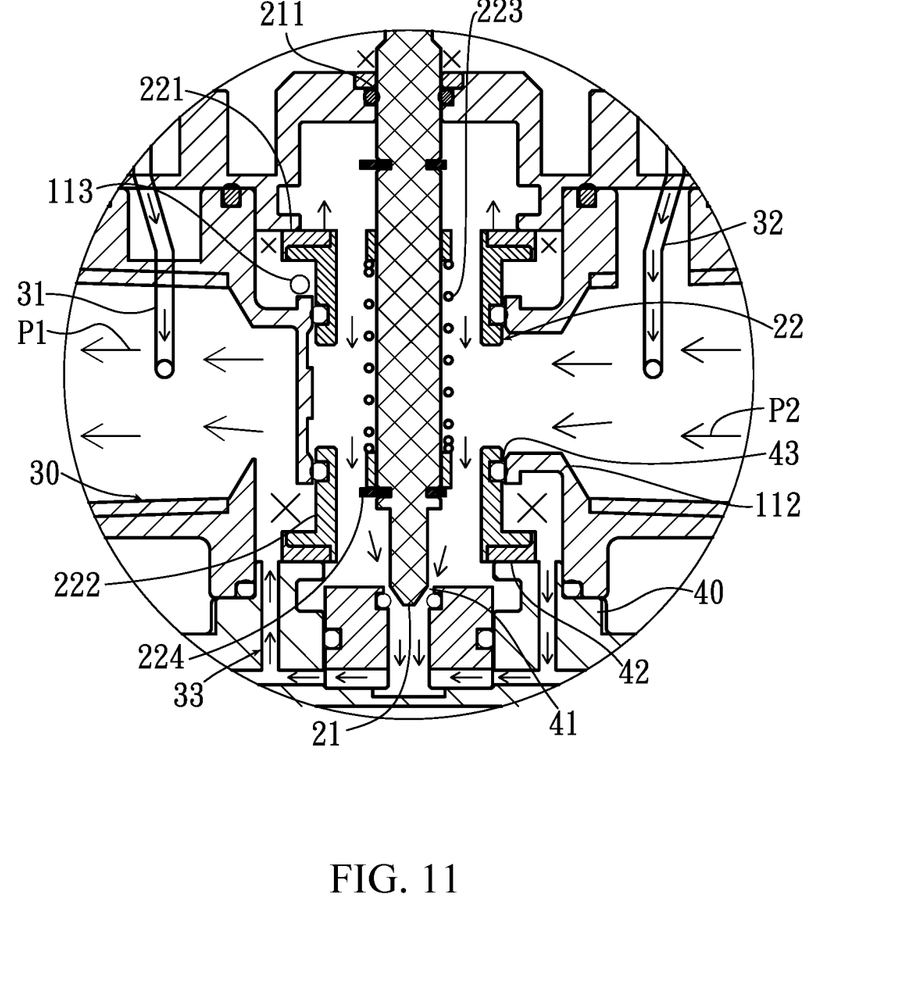
FIG. 11 is an enlarged view of a portion of FIG. 10 of the present invention.

Referring to FIGS. 10 and 11 of the drawings, which is a first stage of vacuum increasing, when the vacuum pressure electromagnetic valve (131) is activated, the primary side pressure (P1) works with the vacuum pressure electromagnetic valve (131) to flow through the guide channel (31) and the regulation channel (134) to the interior of the vacuum pressure chamber (23) to form the vacuum pressure (PT), and also drive the main diaphragm (20) and the pilot discharge straight rod (21) to move upward. Under such a condition, the first valve gate (41) is opened to allow the primary side pressure (P1) to pass through the first valve gate (41) and along the secondary channel (33) to form the secondary side pressure (P2), causing the vacuum level to increase for the first stage.

Figure 12:
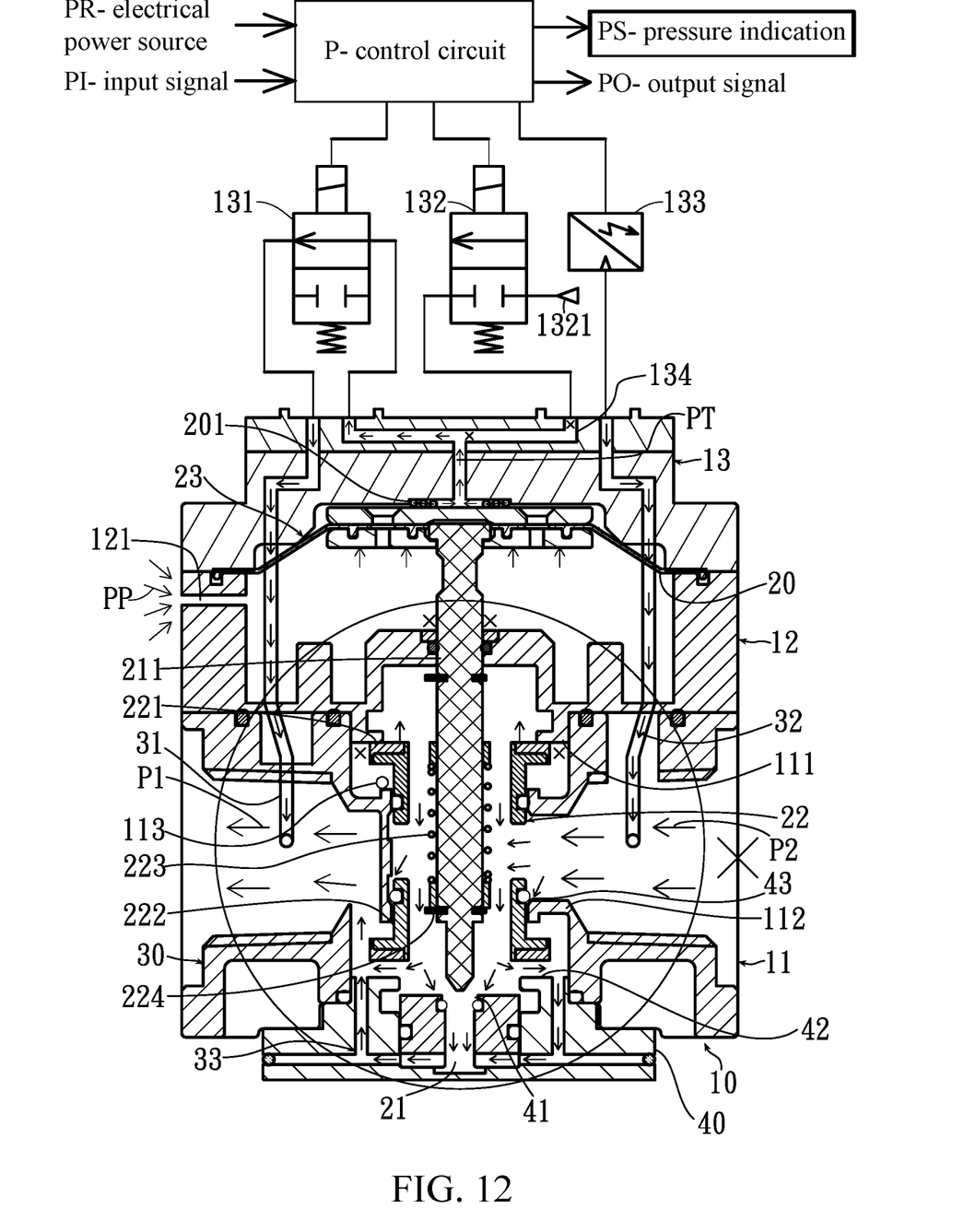
FIG. 12 is a schematic view illustrating a second stage of vacuum increase of the present invention.
Figure 13:
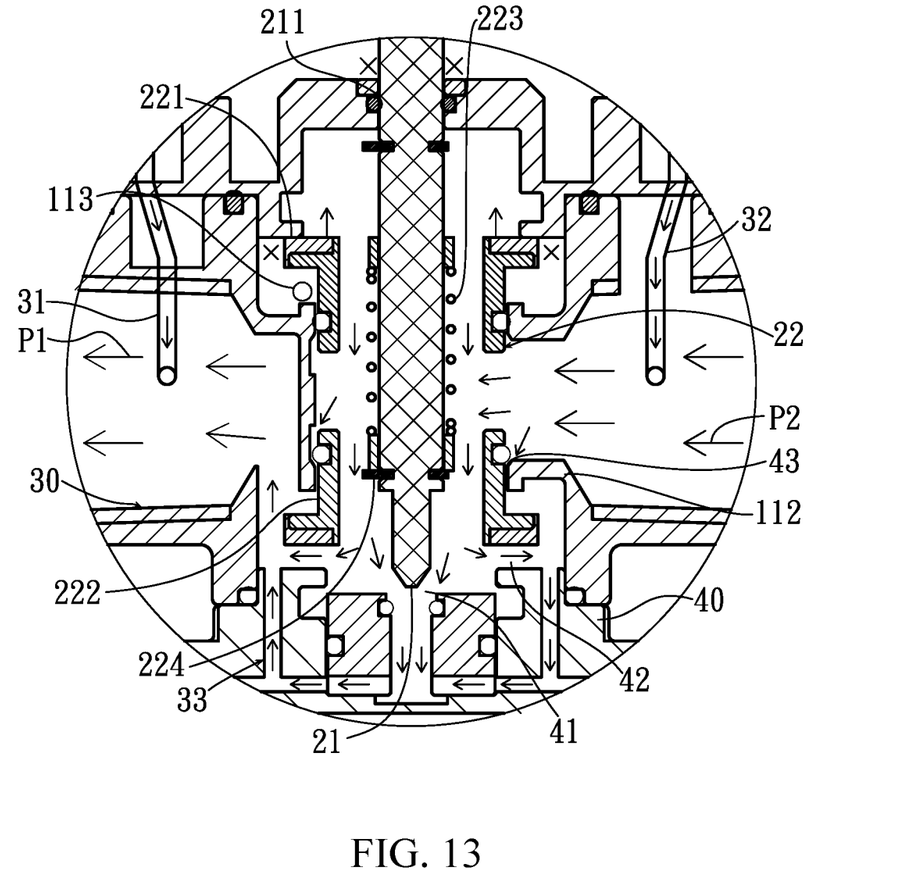
FIG. 13 is an enlarged view of a portion of FIG. 12 of the present invention.

Referring to FIGS. 12 and 13 of the drawings, the lower valve internal wall (112) further comprises: a third valve gate (43) that is disposed above the second valve gate (42). The third valve gate (43) is generally operable to match with the opening and closure of the second valve gate (42) for simultaneous operation therewith. When the vacuum pressure electromagnetic valve (131) is kept continuously activated, the main diaphragm (20) moves upward to reach a top of the vacuum pressure chamber (23) and under such a condition, a second stage of vacuum increase is formed, and the pilot discharge straight rod (21) drives the convex members (222) below the vacuum valve gate assembly (22) to move upward in unison therewith, making the second valve gate (42) and the third valve gate (43) to simultaneously open, allowing more primary side pressure (P1) to flow to the secondary side pressure (P2) as a second stage of increase so that the response time of increasing vacuum level is further shortened.

In summary, the vacuum large-capacity electrically controlled proportional valve of the present invention uses the pilot atmosphere channel (121) and the pilot discharge straight rod (21) to work with each other to allow external air to flow, by means of the first vacuum destruction valve gate (211) and the second vacuum destruction valve gate (221), to the secondary side pressure (P2) for decreasing vacuum level and also uses the pilot discharge straight rod moving in combination with the vacuum valve gate assembly (22) to have the first valve gate (41), the second valve gate (42), and the third valve gate (43) accelerate a process of increasing vacuum level, so as to improve the response time of regulation and being suitable for use with an electrically controlled proportional valve of an even large capacity, further simplifying the issue of inconvenience of tests caused by the complicated gas circuit of the prior art.

We claim:

1. A vacuum large-capacity electrically controlled proportional valve, comprising:

a main body, which is formed by connecting, in sequence from bottom to top, a middle valve seat and a guide seat to a valve bottom seat, with a main diaphragm interposed between the guide seat and the middle valve seat to form a vacuum pressure chamber and an elastic element being provided above the main diaphragm to connect with the guide seat, the main diaphragm being fit, at a center thereof, to a pilot discharge straight rod of a vacuum valve gate assembly, the main body being also provided, in an interior thereof, with a master channel that allows a primary side pressure and a secondary side pressure to flow therein, the master channel being also connected to and in communication with a guide channel and a feedback channel, the guide seat being further provided, on a top side thereof, with a vacuum pressure electromagnetic valve and an atmospheric pressure electromagnetic valve that control closure and opening of the guide channel and a sensor that carries out a detection operation on the feedback channel, the guide seat being also provided, in an interior thereof, with a regulation channel that is connected to and in communication with a top of the vacuum pressure chamber, two ends of the regulation channel being respectively connected to the vacuum pressure electromagnetic valve and the atmospheric pressure electromagnetic valve;

a pilot atmosphere channel, which is formed in the middle valve seat and connected to and in communication with a space below the main diaphragm for an atmospheric pressure to flow;

wherein when the primary side pressure passes through the guide channel, in collaboration with an operation of the vacuum pressure electromagnetic valve to generate a vacuum pressure to flow to the vacuum pressure chamber, through the regulation channel being closed, the main diaphragm of the vacuum pressure chamber returns to a horizontal position to form a steady pressure state; the pilot discharge straight rod is formed with a first vacuum destruction valve gate above the middle valve seat and the vacuum valve gate assembly is formed with a second vacuum destruction valve gate that is arranged in combination with an upper valve internal wall in an interior of the valve bottom seat so that an external atmospheric pressure conducted in through an atmosphere opening of the atmospheric pressure electromagnetic valve drives the first vacuum destruction valve gate and the second vacuum destruction valve gate for making decrease of vacuum of the interior of the main body more quickly and thus shortening a response time of vacuum suction; and the valve bottom seat is further provided, in the interior thereof, with a straight rod fitting seat, the straight rod fitting seat forming, in combination with a lower part of the pilot discharge straight rod, a first valve gate, such that when the vacuum pressure electromagnetic valve is put in continuous operation to generate a vacuum pressure, the first valve gate is caused to open and the primary side pressure passes through a secondary channel to form the secondary side pressure, a lower part of the vacuum valve gate assembly forming, in combination with a lower valve internal wall in the interior of the valve bottom seat, a second valve gate, a third valve gate being provided above the second valve gate, the second valve gate and the third valve gate being operable to open and close simultaneously to accelerate conduction of the primary side pressure into the secondary side pressure, making a speed of increase of vacuum in the interior of the main body faster.

2. The vacuum large-capacity electrically controlled proportional valve according to claim 1, wherein the elastic element is a spring.

3. The vacuum large-capacity electrically controlled proportional valve according to claim 1, wherein the vacuum valve gate assembly is formed of two convex members that are arranged with convex surfaces thereof facing each other and in combination with a spring, the convex members each having an interior made in a penetrating configuration to receive the pilot discharge straight rod to be fit therein, the pilot discharge straight rod being provided with a position-constraining projecting pawl at each of upper and lower portions of a circumference thereof in order to provide constraints to strokes of upward and downward movements of the pilot discharge straight rod.

* * * * *